United States Patent
Guo et al.

(10) Patent No.: US 9,971,892 B2
(45) Date of Patent: *May 15, 2018

(54) METHOD, APPARATUS AND COMPUTER DEVICE FOR SCANNING INFORMATION TO BE SCANNED

(71) Applicant: BAIDU ONLINE NETWORK TECHNOLOGY (BEIJING) CO., LTD., Beijing (CN)

(72) Inventors: Mingqiang Guo, Beijing (CN); Yongcheng Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/630,228

(22) Filed: Jun. 22, 2017

(65) Prior Publication Data

US 2017/0293759 A1     Oct. 12, 2017

Related U.S. Application Data

(63) Continuation of application No. 14/587,867, filed on Dec. 31, 2014, now Pat. No. 9,723,020.

(30) Foreign Application Priority Data

Sep. 12, 2014 (CN) .......................... 2014 1 0465015

(51) Int. Cl.
    *G06F 21/56*     (2013.01)
    *H04L 29/06*     (2006.01)

(52) U.S. Cl.
    CPC ............ *G06F 21/56* (2013.01); *H04L 63/145* (2013.01); *H04L 63/14* (2013.01); *H04L 63/1408* (2013.01)

(58) Field of Classification Search
    CPC ... H04L 63/14; H04L 63/1408; H04L 63/145; G06F 21/56
    See application file for complete search history.

(56) References Cited

U.S. PATENT DOCUMENTS 7,085,934 B1    8/2006    Edwards
7,802,301 B1 *   9/2010    Dreyer ............... H04L 63/1408
                                                      726/24

(Continued)

FOREIGN PATENT DOCUMENTS

CN     101114984 A     1/2008
CN     101697140 A     4/2010

(Continued)

OTHER PUBLICATIONS

First Office Action, Chinese Application No. 201410465015.5, dated Jul. 1, 2015.

(Continued)

*Primary Examiner* — Robert Leung
*Assistant Examiner* — Ayoub Alata
(74) *Attorney, Agent, or Firm* — Orrick, Herrington & Sutcliffe, LLP (57) ABSTRACT

The present invention provides a method for scanning information to be scanned in a computer device, the information to be scanned needing multiple scans, and the method comprising the steps of: a. determining a delay duration from the end of a scan for the information to be scanned to the start of a next scan according to current performance information about the CPU of the computer device; and b. scanning the information to be scanned according to the delay duration. According to the solution of the present invention, by determining a delay duration from the end of a scan for the information to be scanned to the start of a next scan according to current performance information about the CPU of a computer device, and scanning (Continued)

according to the delay duration, problems such as slow running due to high occupancy ratio of CPU resources during scanning can be avoided.

18 Claims, 6 Drawing Sheets

(56) References Cited

U.S. PATENT DOCUMENTS

| | | | |
|---|---|---|---|
| 8,610,727 B1* | 12/2013 | Bao | G06F 9/5044 345/502 |
| 2003/0115509 A1 | 6/2003 | Dubal | |
| 2010/0287558 A1 | 11/2010 | Sandoz et al. | |

FOREIGN PATENT DOCUMENTS

| | | |
|---|---|---|
| CN | 103902310 A | 7/2014 |
| JP | 2001-147908 A | 5/2001 |
| JP | 2001-160041 A | 6/2001 |

OTHER PUBLICATIONS

Communication pursuant to Article 94(3) EPC, European Application No. 14 200 677.4, dated Jan. 27, 2017.
Notice of Grounds for Rejection, Japanese Patent Application No. 2014-264925, dated Apr. 25, 2017.

* cited by examiner

FIG. 6

METHOD, APPARATUS AND COMPUTER DEVICE FOR SCANNING INFORMATION TO BE SCANNED

CROSS REFERENCE TO RELATED APPLICATIONS

This application is a continuation application of co-pending U.S. patent application Ser. No. 14/587,867, filed on Dec. 31, 2014, which claims priority under 35 U.S.C. § 119(a) from Patent Application No. 201410465015.5 filed in the People's Republic of China on Sep. 12, 2014, all of which are expressly incorporated herein by reference in their entireties and for all purposes.

TECHNICAL FIELD

The present invention relates to the field of computer technology, and in particular to a method, apparatus and computer device for scanning information to be scanned.

BACKGROUND

In many cases, security software will start scanning information to be scanned in a computer device, for example, a user carries out an operation to actively trigger the security software to scan files in a user equipment; as another example, when a user downloads a file, the security software is triggered to scan the downloaded file, etc. However, during scanning, except for conventional system programs, the computer device generally also runs various application programs started by the user, e.g., browsers, music players, video, games, office software, etc., and the extent of the influence of which on the overall performance of the computer is different. Therefore, during the scanning of the information to be scanned, the computer may run slowly due to insufficient performance thus affecting the normal running of other programs in the computer device, and thus the user experience is poor.

SUMMARY

An objective of the present invention is to provide a method, apparatus and computer device for scanning information to be scanned.

According to one aspect of the present invention, provided is a method for scanning information to be scanned in a computer device, the information to be scanned needing multiple scans, and the method comprising the steps of:
  a. determining a delay duration from the end of a scan for the information to be scanned to the start of a next scan according to current performance information about the CPU (Central Processing Unit) of the computer device; and
  b. scanning the information to be scanned according to the delay duration.

According to another aspect of the present invention, also provided is an apparatus for scanning information to be scanned in a computer device, the information to be scanned needing multiple scans, and the apparatus comprising the following means:
  a means for determining a delay duration from the end of a scan for the information to be scanned to the start of a next scan according to current performance information about the CPU of the computer device; and
  a means for scanning the information to be scanned according to the delay duration.

According to another aspect of the present invention, also provided is a computer device comprising the apparatus for scanning information to be scanned disclosed in the present invention.

Compared with the prior art, the present invention has the following advantages: 1) by determining a delay duration from the end of a scan for information to be scanned to the start of a next scan according to current performance information about the CPU, and controlling the scanning of the information to be scanned according to the delay duration, the scanning process will not affect the normal running of the programs in the computer device, so as to avoid problems such as slow running due to high occupancy ratio of CPU resources during scanning, thereby enhancing user satisfaction; 2) the delay duration may be determined before scanning the information to be scanned, and then the information to be scanned is scanned multiple times according to the delay duration, that is, during the multiple scans, the delay duration from the end of each scan to the start of a next scan is a fixed length of time; and 3) in the multiple scans of the information to be scanned, by the computer device determining, when each scan is coming to an end or after the end, the delay duration from the end of the current scan to the start of a next scan in real time, and controlling the start of the next scan according to the delay duration, the scanning of the information to be scanned can be more adaptable to the current usage of the CPU, that is, in the multiple scans, the delay duration from the end of each scan to the start of a next scan is determined in real time according to the current performance information about the CPU, so as to better avoid problems such as slow running due to high occupancy ratio of CPU resources during scanning.

BRIEF DESCRIPTION OF THE ACCOMPANYING DRAWINGS

Through reading the detailed description hereinafter of the non-limiting embodiments with reference to the following accompanying drawings, the other features, objectives, and advantages of the present invention will become more apparent.

The same or similar reference numerals in the accompanying drawings indicate the same or similar components.

DETAILED DESCRIPTION OF THE PREFERRED EMBODIMENTS

Hereinafter, the present invention will be further described in detail in conjunction with the accompanying drawings.

Figure 1:
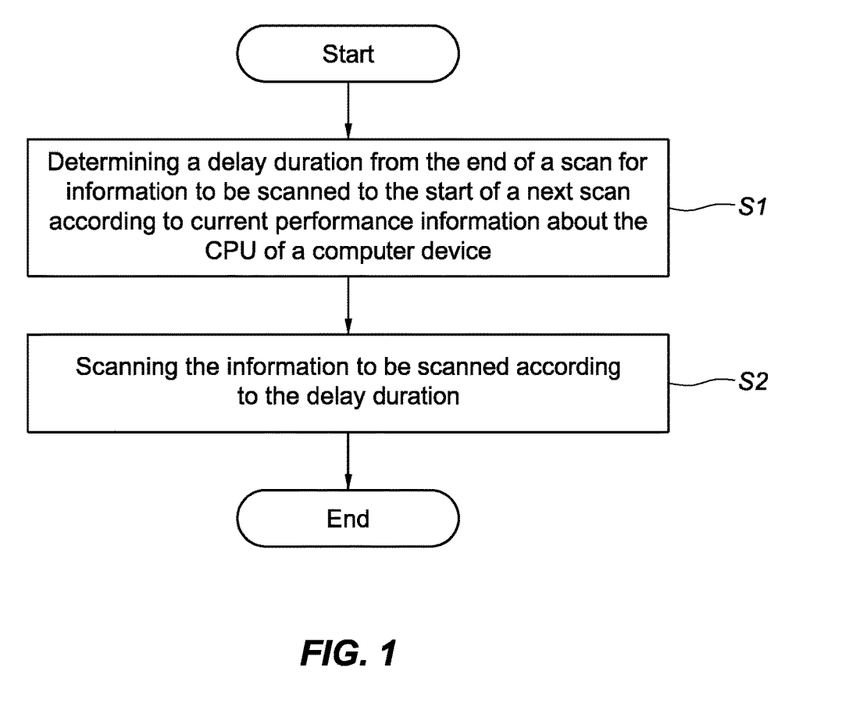
FIG. 1 is a schematic flow diagram of a method for scanning information to be scanned according to an embodiment of the present invention.

FIG. 1 is a schematic flow diagram of a method for scanning information to be scanned according to an embodiment of the present invention.

The method of this embodiment is implemented mainly through a computer device. The computer device comprises but is not limited to a network device and a user equipment. The network device comprises but is not limited to a single network server, a server group consisting of a plurality of network servers, etc.; and the network where the network device is located comprises but is not limited to the Internet, a Wide Area Network, a Metropolitan Area Network, a Local Area Network, a VPN (Virtual Private Network), etc. The user equipment comprises but is not limited to a PC, a tablet computer, a smart phone, a PDA, an IPTV, etc.

It should be noted that the computer devices are merely exemplary, and other existing or future possibly emerging computer devices, if applicable to the present invention, should also be included in the scope of protection of the present invention, and are incorporated herein by reference.

The method according to this embodiment comprises steps S1 and S2.

In step S1, a computer device determines a delay duration from the end of a scan for information to be scanned to the start of a next scan according to current performance information about a CPU of the computer device. The information to be scanned comprises multiple files to be scanned, and the information to be scanned needs multiple scans.

The current performance information about the CPU is used for indicating the current performance of the CPU in the computer device. Preferably, the current performance information about the CPU comprises but is not limited to:

1) the current occupancy ratio of the CPU.

The current occupancy ratio of the CPU is used for indicating the current usage of CPU resources in the computer device. The current occupancy ratio of the CPU is associated with all programs currently running in the computer device.

2) The number of CPU cores.

The CPU cores comprise but are not limited to: a CPU physical core, a CPU logic core, etc.

Preferably, for a one-pass scan, where the number of CPU cores of the computer device is 1, the object of the one-pass scan is an unscanned file in the information to be scanned; and when the number of CPU cores of the computer device is more than one, the object of the one-pass scan may be multiple unscanned files in the information to be scanned, and each CPU core may execute scanning for one unscanned file.

Specifically, the computer device may determine a delay duration from the end of a scan for the information to be scanned to the start of a next scan in many ways according to the current performance information about the CPU of the computer device.

For example, the current performance information about the CPU comprises the current occupancy ratio of the CPU, and the computer device predefines multiple occupancy ratio ranges, and each occupancy ratio range corresponds to a duration value; and then in step S1, the computer device determines the occupancy ratio range in which the current occupancy ratio of the CPU of the computer device falls, and uses the duration value corresponding to the occupancy ratio range as the delay duration.

As another example, when the current performance information about the CPU comprises the current occupancy ratio of the CPU and the number of CPU cores, the computer device computes a ratio between the current occupancy ratio of the CPU and the number of CPU cores, and determines the delay duration based on this ratio.

Preferably, the information about the CPU comprises the current occupancy ratio of the CPU and the number of CPU cores, and the computer device determines the delay duration according to the current performance information about the CPU, a first time interval, and a predetermined reference value of the number of CPU cores.

Preferably, the first time interval is a predetermined length of time, for example, the first time interval is 1000 ms (milliseconds).

The predetermined reference value of the number of CPU cores is used for indicating the number of CPU cores of computer devices used by most users. Preferably, the predetermined reference value of the number of CPU cores may be acquired by means of questionnaire survey, market survey, statistical analysis, etc.; and more preferably, the predetermined reference value of the number of CPU cores may be reacquired regularly. For example, it is determined by a market survey that the number of CPU cores of the computer devices used by 70% of users is 2, thus the predetermined reference value of the number of CPU cores is 2.

Specifically, the computer device determines the delay duration according to the current occupancy ratio of the CPU, the number of CPU cores, the first time interval and the predetermined reference value of the number of CPU cores.

Preferably, the computer device determines the delay duration according to the current occupancy ratio of the CPU, the number of CPU cores, the first time interval and the predetermined reference value of the number of CPU cores, and based on the following formula:

$$T = P_{cpu} * T_0 / (N_{core}/N_0)$$

where T is the delay duration, $T_0$ is the first time interval, $P_{cpu}$ is the current occupancy ratio of the CPU, $N_{core}$ is the number of CPU cores, and $N_0$ is the predetermined reference value of the number of CPU cores.

It shall be noted that, the examples above are merely used for illustrating the technical solutions of the present invention rather than limiting same, and those skilled in the art shall understand that any implementation of determining a delay duration from the end of a scan for the information to be scanned to the start of a next scan according to current performance information about the CPU of the computer device shall be included in the scope of the present invention.

In step S2, the computer device scans the information to be scanned according to the delay duration.

For a file in the information to be scanned, the computer device acquires feature information about the file (e.g., MD5 (Message-Digest Algorithm 5), hash feature value, etc.), and when a virus library has a virus feature matching the feature information, the computer device determines that this file is a virus file; and when the virus library has no virus feature matching the feature information, the computer device determines that this file is a secure file.

A more specific implementation of the computer device scanning the information to be scanned according to the delay duration will be detailed in the following embodiments.

As a preferred solution, this implemented method also comprises steps S5 and S6.

In step S5, before starting to scan the information to be scanned, the computer device judges whether the current performance information about the CPU satisfies a predetermined scanning condition.

Specifically, before starting to scan the information to be scanned, the computer device acquires the current performance information about the CPU, and judges whether the current performance information about the CPU satisfies a predetermined scanning condition.

The predetermined scanning condition is a predetermined condition for triggering scanning. Preferably, the current performance information about the CPU comprises the current occupancy ratio of the CPU and/or the number of CPU cores, and the predetermined scanning condition comprises but is not limited to at least one of the following:

1) the current occupancy ratio of the CPU is lower than an occupancy ratio threshold; and
2) the number of CPU cores is greater than a core number threshold.

In step S6, when the current performance information about the CPU satisfies the predetermined scanning condition, the computer device executes steps S1 and S2.

For example, the predetermined scanning condition is that the current occupancy ratio of the CPU is lower than an occupancy ratio threshold, and the occupancy ratio threshold is 80%. In step S5, the computer device determines that the current occupancy ratio of the CPU is 20%, and satisfies the predetermined scanning condition; and then in step S6, the computer device executes steps S1 and S2 to scan the information to be scanned.

When the current performance information about the CPU does not satisfy the predetermined scanning condition, the computer device may not execute the scanning operation, or when scanning is triggered again subsequently, e.g., scanning is triggered by a user operation, the scanning operation is executed.

Alternatively preferably, this preferred solution also comprises the steps of: when the current performance information about the CPU does not satisfy the predetermined scanning condition, the computer device executes step S5 again after a second time interval. The second time interval is a predetermined length of time; and preferably, the second time interval is equal to the first time interval.

For example, the second time interval is 1000 ms. When the current performance information about the CPU does not satisfy the predetermined scanning condition, the computer device triggers step S5 to execute the operation again after waiting for 1000 ms to reacquire the current performance information about the CPU and judge whether the reacquired current performance information about the CPU satisfies the predetermined condition.

According to the solution of this embodiment, by determining a delay duration from the end of a scan for information to be scanned to the start of a next scan according to the current performance information about the CPU, and controlling the scanning of the information to be scanned according to the delay duration, the scanning process will not affect the normal running of the programs in the computer device, so as to avoid problems such as slow running due to high occupancy ratio of CPU resources during scanning, thereby enhancing user satisfaction.

Figure 2:
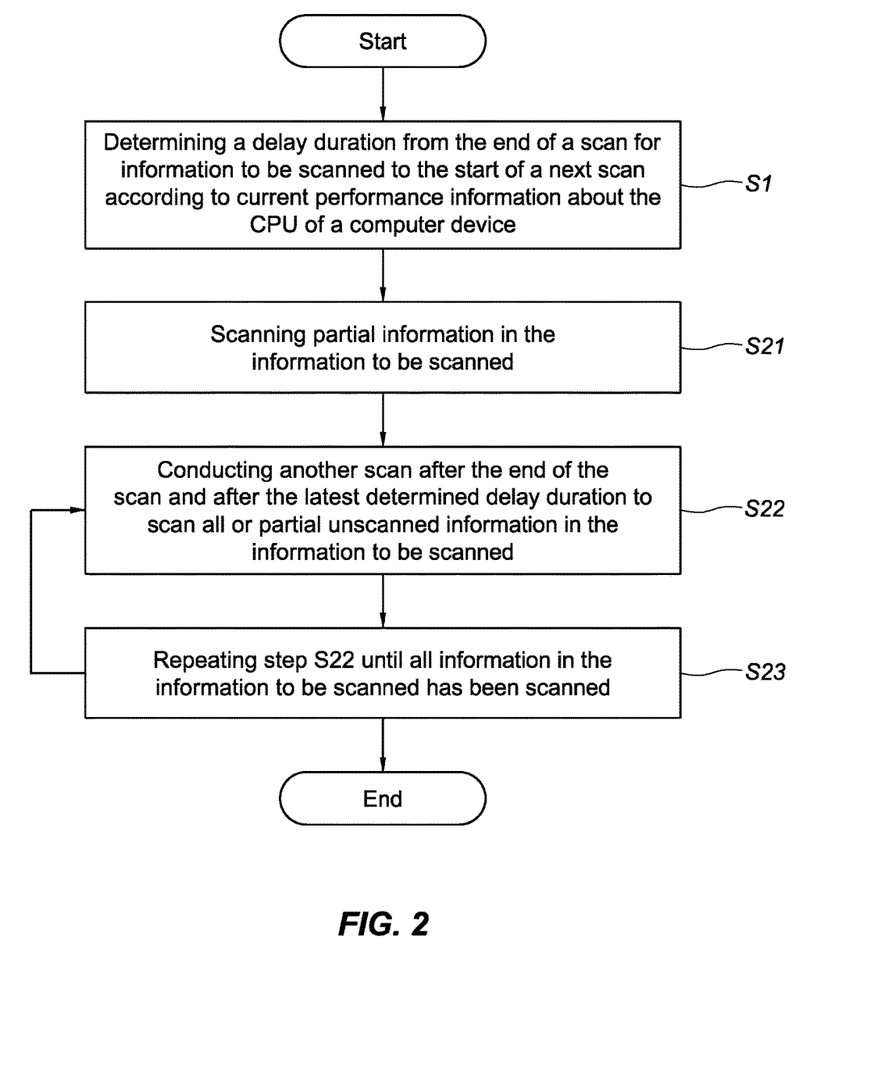
FIG. 2 is a schematic flow diagram of a method for scanning information to be scanned according to another embodiment of the present invention.

FIG. 2 is a schematic flow diagram of a method for scanning information to be scanned according to another embodiment of the present invention. The method of this embodiment is implemented mainly through a computer device, and any description of the computer device with reference to the embodiment as shown in FIG. 1 is incorporated herein by reference.

The method according to this embodiment comprises steps S1 and step S2, step S2 further comprising steps S21, S22 and S23. Step S1 is described in detail with reference to the embodiment as shown in FIG. 1, and will not be repeated redundantly again here.

In step S21, the computer device scans partial information in the information to be scanned.

Preferably, the partial information comprises one or more files in the information to be scanned. For each file in the partial information, the computer device acquires feature information about the file (e.g., MD5, hash feature value, etc.), and when a virus library has a virus feature matching the feature information, the computer device determines that this file is a virus file; and when the virus library has no virus feature matching the feature information, the computer device determines that this file is a secure file.

It shall be noted that, the examples above are merely used for better illustrating the technical solutions of the present invention rather than limiting same, and those skilled in the art shall understand that any implementation of scanning partial information in the information to be scanned shall be included in the scope of the present invention.

In step S22, after the end of scan and after the delay duration, the computer device conducts another scan to scan all or partial unscanned information in the information to be scanned.

For example, the number of CPU cores is 1, and the delay duration determined in step S1 is 100 ms. In step S21, the computer device scans one file in the information to be scanned; and in step S22, after the end of scan for this one file and 100 ms later, the computer device conducts another scan to scan one unscanned file in the information to be scanned.

It shall be noted that, the examples above are merely used for better illustrating the technical solutions of the present invention rather than limiting same, and those skilled in the art shall understand that any implementation of conducting another scan after the end of the scan and after the delay duration to scan all or partial unscanned information in the information to be scanned shall be included in the scope of the present invention.

In step S23, the computer device repeats step S22, until all information in the information to be scanned has been scanned.

For example, the number of CPU cores is 1, the delay duration determined in step S1 is 100 ms, and the information to be scanned comprises four files: :file 1, file 2, file 3 and file 4. In step S21, the computer device scans file 1 in the information to be scanned; in step S22, after the end of the scan for file 1 and 100 ms later, the computer device conducts another scan to scan file 2; in step S23, the computer device judges whether the information to be scanned has an unscanned file, then the computer device repeats step S22, and conducts another scan after the end of the scan for file 2 and 100 ms later to scan file 3; and then similarly, step S23 repeats step S22 to conduct another scan after the end of the scan for file 3 and 100 ms later to scan file 4; and the computer device determines that all information in the information to be scanned has been scanned, and stops the scanning operation.

It shall be noted that, the examples above are merely used for better illustrating the technical solutions of the present invention rather than limiting same, and those skilled in the art shall understand that any implementation of repeating step S22 until all information in the information to be scanned has been scanned shall be included in the scope of the present invention.

According to the solution of this embodiment, the delay duration may be determined before scanning the information to be scanned, and then the information to be scanned is scanned multiple times according to the delay duration, that is, during the multiple scans, the delay duration from the end of each scan to the start of a next scan is a fixed length of time.

Figure 3:
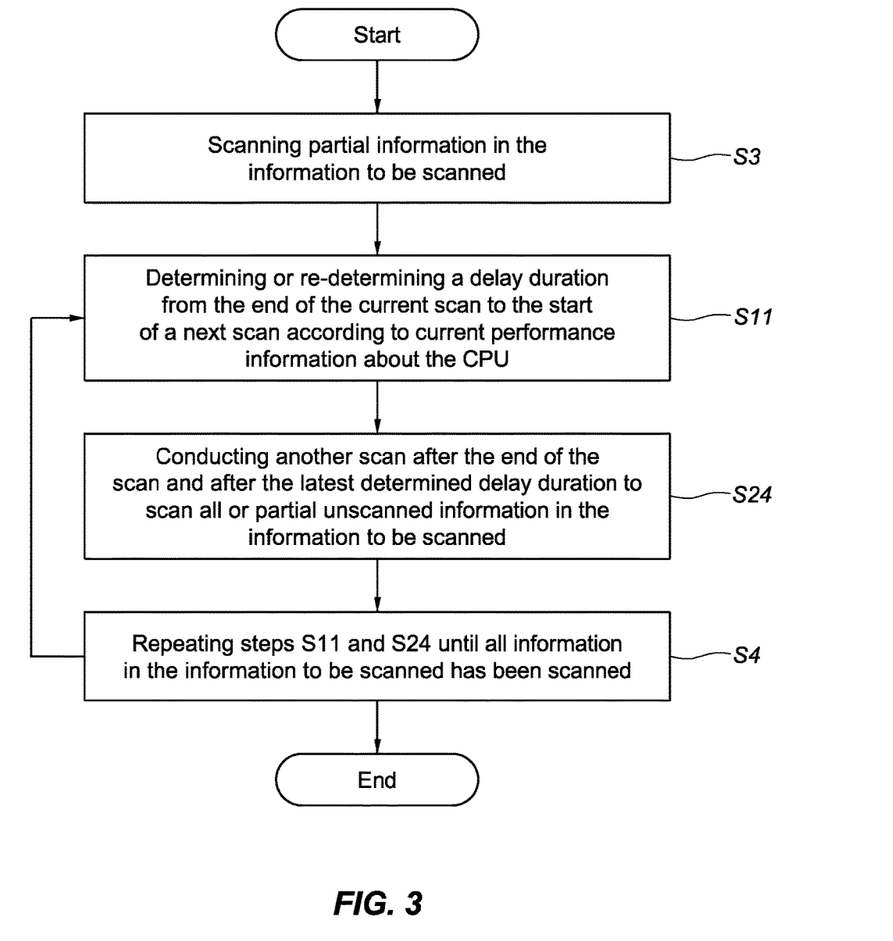
FIG. 3 is a schematic flow diagram of a method for scanning information to be scanned according to another embodiment of the present invention.

FIG. 3 is a schematic flow diagram of a method for scanning information to be scanned according to another embodiment of the present invention. The method of this embodiment is implemented mainly through a computer device, and any description of the computer device with reference to the embodiment as shown in FIG. 1 is incorporated herein by reference.

The method according to this embodiment comprises steps S1, S2, S3 and S4. Step S1 further comprises step S11; and step S2 further comprises step S24.

In step S3, the computer device scans partial information in the information to be scanned.

For example, when the number of CPU cores is 1, the computer device scans one file in the information to be scanned.

As another example, when the number of CPU cores is 2, the computer device scans two files in the information to be scanned.

In step S11, the computer device determines a delay duration from the end of the current scan to the start of a next scan according to the current performance information about the CPU.

Specifically, for each scan, the computer device needs to acquire the current performance information about the CPU, and determine a delay duration from the end of this scan to the start of a next scan according to the current performance information about the CPU.

The implementation of the computer device determining a delay duration from the end of the current scan to the start of a next scan according to the current performance information about the CPU is the same as or similar to the implementation of step S1 with reference to FIG. 1, and will not be repeated redundantly here.

Then, in step S24, after the end of the scan and after the latest determined delay duration, the computer device conducts another scan to scan all or partial unscanned information in the information to be scanned.

For example, in step S11, the computer device determines a delay duration from the end of the current scan to the start of a next scan according to the current performance information about the CPU; and in step S24, after the end of the current scan and after the latest determined delay duration, the computer device conducts another scan to scan all or partial unscanned information in the information to be scanned.

In step S4, the computer device repeats steps S11 and S24, until all information in the information to be scanned has been scanned.

For example, the number of CPU cores is 1, and the information to be scanned comprises four files: file 1, file 2, file 3 and file 4. In step S3, the computer device scans file 1; in step S11, the computer device determines a delay time t1 from the end of the scan for file 1 to the start of a next scan; in step S24, after the end of the scan for file 1 and after t1, the computer device conducts another scan to scan file 2; in step S4, the computer device determines that the information to be scanned still has an unscanned file, repeats step S11 to determine a delay time t2 from the end of the scan for file 2 to the start of a next scan, and then repeats step S24, so as to conduct another scan after the end of the scan for file 2 and after t2 to scan file 3; similarly, in step S4, step S11 is repeated to determine a delay time t3 from the end of the scan for file 3 to the start of a next scan, and then step S24 is repeated to conduct another scan after the end of the scan for file 3 and after t3 to scan file 4; and the computer device judges whether all information in the information to be scanned has been scanned after scanning file 4, and stops the scanning operation.

It shall be noted that, it is unnecessary to execute steps S3 and S11 in sequence strictly, for example, the computer device may execute S11 in parallel when the scan in step S3 is coming to an end to determine the delay duration; as another example, the computer device may execute S11 immediately after the end of the scan in step S3 to determine the delay duration. Similarly, the computer device may execute step S4 when the scan in step S24 is coming to an end to repeat step S11; and the computer device may also execute step S4 immediately after the end of the scan in step S24 to trigger step S11.

According to the solution of this embodiment, in the multiple scans for the information to be scanned, by the computer device determining, when each scan is coming to an end or after the end, a delay duration from the end of the current scan to the start of a next scan in real time, and controlling the start of the next scan according to the delay duration, the scanning of the information to be scanned can be more adaptable to the current usage of the CPU. That is, in the multiple scans, the delay duration from the end of each scan to the start of a next scan is determined in real time according to the current performance information about the CPU, so as to better avoid problems such as slow running due to high occupancy ratio of CPU resources during scanning.

Figure 4:
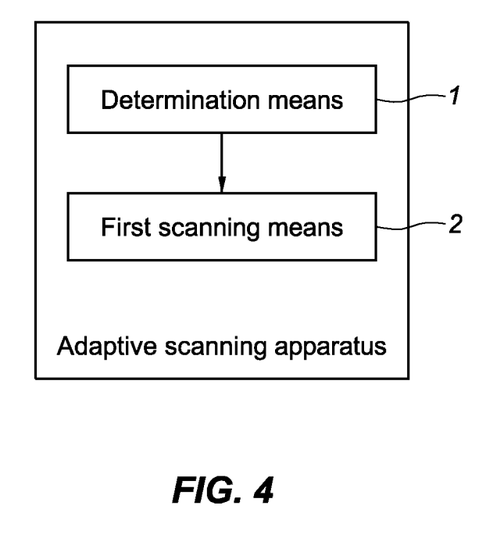
FIG. 4 is a structural schematic diagram of an apparatus for scanning information to be scanned according to an embodiment of the present invention.

FIG. 4 is a structural schematic diagram of an apparatus for scanning information to be scanned according to an embodiment of the present invention. The apparatus of this embodiment (hereinafter referred to as "adaptive scanning apparatus") comprises a means for determining a delay duration from the end of a scan for the information to be scanned to the start of a next scan according to current performance information about the CPU of the computer device (hereinafter referred to as "determination means 1") and a means for scanning the information to be scanned according to the delay duration (hereinafter referred to as "first scanning means 2").

The determination means 1 determines a delay duration from the end of a scan for information to be scanned to the start of a next scan according to the current performance information about the CPU of the computer device. The information to be scanned comprises multiple files to be scanned, and the information to be scanned needs multiple scans.

The current performance information about the CPU is used for indicating the current performance of the CPU in the computer device. Preferably, the current performance information about the CPU comprises but is not limited to:

1) the current occupancy ratio of the CPU.

The current occupancy ratio of the CPU is used for indicating the current usage of CPU resources in the computer device. The current occupancy ratio of the CPU is associated with all programs currently running in the computer device.

2) The number of CPU cores.

The CPU cores comprise but are not limited to: a CPU physical core, a CPU logic core, etc.

Preferably, for a one-pass scan, where the number of CPU cores of the computer device is 1, the object of the one-pass scan is an unscanned file in the information to be scanned; and when the number of CPU cores of the computer device is more than one, the object of the one-pass scan may be multiple unscanned files in the information to be scanned, and each CPU core may execute scanning for one unscanned file.

Specifically, the determination means 1 may determine the delay duration from the end of a scan for the information to be scanned to the start of a next scan in many ways according to the current performance information about the CPU of the computer device.

For example, the current performance information about the CPU comprises the current occupancy ratio of the CPU, and the computer device predefines multiple occupancy ratio ranges, and each occupancy ratio range corresponds to a duration value; and then the determination means 1 determines the occupancy ratio range in which the current occupancy ratio of the CPU of the computer device falls, and uses the duration value corresponding to the occupancy ratio range as the delay duration.

As another example, when the current performance information about the CPU comprises the current occupancy ratio of the CPU and the number of CPU cores, the determination means 1 computes a ratio between the current occupancy ratio of the CPU and the number of CPU cores, and determines the delay duration based on this ratio.

Preferably, the determination means 1 comprises a second sub-determination means (not shown in the figure). The information about the CPU comprises the current occupancy ratio of the CPU and the number of CPU cores, and the second sub-determination means determines the delay duration according to the current performance information about the CPU, a first time interval, and a predetermined reference value of the number of CPU cores.

Preferably, the first time interval is a predetermined length of time, for example, the first time interval is 1000 ms (milliseconds).

The predetermined reference value of the number of CPU cores is used for indicating the number of CPU cores of the computer devices used by most users. Preferably, the predetermined reference value of the number of CPU cores may be acquired by means of questionnaire survey, market survey, statistical analysis, etc.; and more preferably, the predetermined reference value of the number of CPU cores may be reacquired regularly. For example, it is determined by a market survey that the number of CPU cores of the computer devices used by 70% of users is 2, thus the predetermined reference value of the number of CPU cores is 2.

Specifically, the second sub-determination means determines the delay duration according to the current occupancy ratio of the CPU, the number of CPU cores, the first time interval and the predetermined reference value of the number of CPU cores.

Preferably, the second sub-determination means further comprises third sub-determination means (not shown in the figure). The third sub-determination means determines the delay duration according to the current occupancy ratio of the CPU, the number of CPU cores, the first time interval and the predetermined reference value of the number of CPU cores, and based on the following formula:

$$T=P_{cpu}*T_0/(N_{core}/N_0)$$

where T is the delay duration, T0 is the first time interval, Pcpu is the current occupancy ratio of the CPU, Ncore is the number of CPU cores, and N0 is the predetermined reference value of the number of CPU cores.

It shall be noted that the examples above are merely used for better illustrating the technical solutions of the present invention rather than limiting same, and those skilled in the art shall understand that any implementation of determining a delay duration from the end of a scan for the information to be scanned to the start of a next scan according to the current performance information about the CPU of the computer device shall be included in the scope of the present invention.

The first scanning means 2 scans the information to be scanned according to the delay duration.

For a file in the information to be scanned, the first scanning means 2 acquires feature information about the file (e.g., MD5, hash feature value, etc.), and when a virus library has a virus feature matching the feature information, the first scanning means 2 determines that this file is a virus file; and when the virus library has no virus feature matching the feature information, the first scanning means 2 determines that this file is a secure file.

A more specific implementation of the first scanning means 2 scanning the information to be scanned according to the delay duration will be detailed in the following embodiments.

As a preferred solution, the adaptive scanning apparatus of this embodiment also comprises determination means (not shown in the figure) and third trigger means (not shown in the figure).

Before starting to scan the information to be scanned, the determination means judges whether the current performance information about the CPU satisfies a predetermined scanning condition.

Specifically, before starting to scan the information to be scanned, the determination means acquires the current performance information about the CPU, and judges whether the current performance information about the CPU satisfies a predetermined scanning condition.

The predetermined scanning condition is a predetermined condition for triggering scanning. Preferably, the current performance information about the CPU comprises the current occupancy ratio of the CPU and/or the number of CPU cores, and the predetermined scanning condition comprises but is not limited to at least one of the following:

1) the current occupancy ratio of the CPU is lower than an occupancy ratio threshold; and
2) the number of CPU cores is greater than a core number threshold.

When the current performance information about the CPU satisfies the predetermined scanning condition, the third trigger means triggers the determination means 1 and the first scanning means 2 to execute operations.

For example, the predetermined scanning condition is that the current occupancy ratio of the CPU is lower than an occupancy ratio threshold, and the occupancy ratio threshold is 80%. The determination means determines that the current occupancy ratio of the CPU is 20%, satisfying the predetermined scanning condition; and the third trigger means triggers the determination means 1 and the first scanning means 2 to execute operations to scan the information to be scanned.

When the current performance information about the CPU does not satisfy the predetermined scanning condition, the computer device may not execute the scanning operation, or when scanning is triggered again subsequently, e.g., scanning is triggered by a user operation, the scanning operation is executed.

Alternatively preferably, the adaptive scanning apparatus also comprises fourth trigger means (not shown in the figure): when the current performance information about the CPU does not satisfy the predetermined scanning condition, after a second time interval, the fourth trigger means triggers the determination means to execute the operation again. The second time interval is a predetermined length of time; and preferably, the second time interval is equal to the first time interval.

For example, the second time interval is 1000 ms. When the current performance information about the CPU does not satisfy the predetermined scanning condition, after waiting for 1000 ms, the fourth trigger means triggers the determination means to execute the operation again to reacquire the current performance information about the CPU, and judge whether the reacquired current performance information about CPU satisfies the predetermined condition.

According to the solution of this embodiment, by determining a delay duration from the end of a scan for information to be scanned to the start of a next scan according to the current performance information about the CPU, and controlling the scanning of the information to be scanned according to the delay duration, the scanning process will not affect the normal running of the programs in the computer device, so as to avoid problems such as slow running due to high occupancy ratio of CPU resources during scanning, thereby enhancing user satisfaction.

Figure 5:
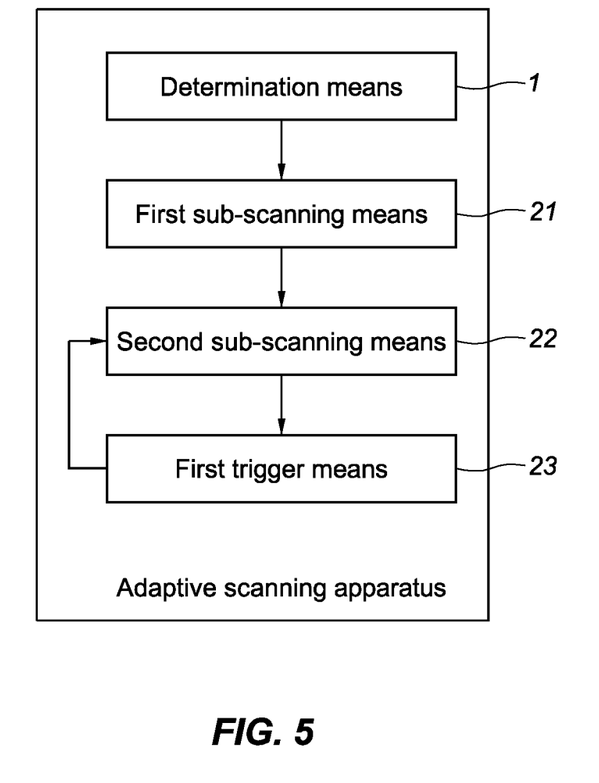
FIG. 5 is a structural schematic diagram of an apparatus for scanning information to be scanned according to another embodiment of the present invention.

FIG. 5 is a structural schematic diagram of an apparatus for scanning information to be scanned according to another embodiment of the present invention. The adaptive scanning apparatus of this embodiment comprises a determination means 1 and a first scanning means 2, wherein the first scanning means 2 further comprises a means for scanning partial information in the information to be scanned (hereinafter referred to as "first sub-scanning means 21"), a means for conducting another scan after the end of the scan and after the delay duration to scan all or partial unscanned information in the information to be scanned (hereinafter referred to as "second sub-scanning means 22"), and a means for triggering the second sub-scanning means 22 to repeatedly execute an operation until all information in the information to be scanned has been scanned (hereinafter referred to as "first trigger means 23"). The determination means 1 is described in detail with reference to the embodiment as shown in FIG. 4, and will not be repeated redundantly here.

The first sub-scanning means 21 scans partial information in the information to be scanned.

Preferably, the partial information comprises one or more files in the information to be scanned. For each file in the partial information, the first sub-scanning means 21 acquires feature information about the file (e.g., MD5, hash feature value, etc.), and when a virus library has a virus feature matching the feature information, the first sub-scanning means 21 determines that this file is a virus file; and when the virus library has no virus feature matching the feature information, the first sub-scanning means 21 determines that this file is a secure file.

It shall be noted that, the examples above are merely used for better illustrating the technical solutions of the present invention rather than limiting same, and those skilled in the art shall understand that any implementation of scanning partial information in the information to be scanned shall be included in the scope of the present invention.

After the end of the scan and after the delay duration, the second sub-scanning means 22 conducts another scan to scan all or partial unscanned information in the information to be scanned.

For example, the number of CPU cores is 1, and the delay duration determined by the determination means 1 is 100 ms. The first sub-scanning means 21 scans one file in the information to be scanned; and after the end of the scan for this one file and 100 ms later, the second sub-scanning means 22 conducts another scan to scan one unscanned file in the information to be scanned.

It shall be noted that, the examples above are merely used for better illustrating the technical solutions of the present invention rather than limiting same, and those skilled in the art shall understand that any implementation of conducting another scan again after the end of the scan and after the delay duration to scan all or partial unscanned information in the information to be scanned shall be included in the scope of the present invention.

The first trigger means 23 triggers the second sub-scanning means 22 to repeatedly execute an operation, until all information in the information to be scanned has been scanned.

For example, the number of CPU cores is 1, the delay duration determined by the determination means 1 is 100 ms, and the information to be scanned comprises four files: :file 1, file 2, file 3 and file 4. The first sub-scanning means 21 scans file 1 in the information to be scanned; after the end of the scan for file 1 and 100 ms later, the second sub-scanning means 22 conducts another scan to scan file 2; the first trigger means 23 judges whether the information to be scanned has an unscanned file, then the first trigger means 23 triggers the second sub-scanning means 22 to repeatedly execute the operation, and conducts another scan after the end of the scan for file 2 and 100 ms later to scan file 3; and then similarly, the first trigger means 23 triggers the second sub-scanning means 22 to repeatedly execute an operation to conduct another scan after the end of the scan for file 3 and 100 ms later to scan file 4; and the first trigger means 23 determines that all information in the information to be scanned has been scanned, and stops the scanning operation.

It shall be noted that, the examples above are merely used for better illustrating the technical solutions of the present invention rather than limiting same, and those skilled in the art shall understand that any implementation of triggering the second sub-scanning means 22 to repeatedly execute an operation until all information in the information to be scanned has been scanned shall be included in the scope of the present invention.

According to the solution of this embodiment, the delay duration may be determined before scanning the information to be scanned, and then the information to be scanned is scanned multiple times according to the delay duration, that is, during the multiple scans, the delay duration from the end of each scan to the start of a next scan is a fixed length of time.

Figure 6:
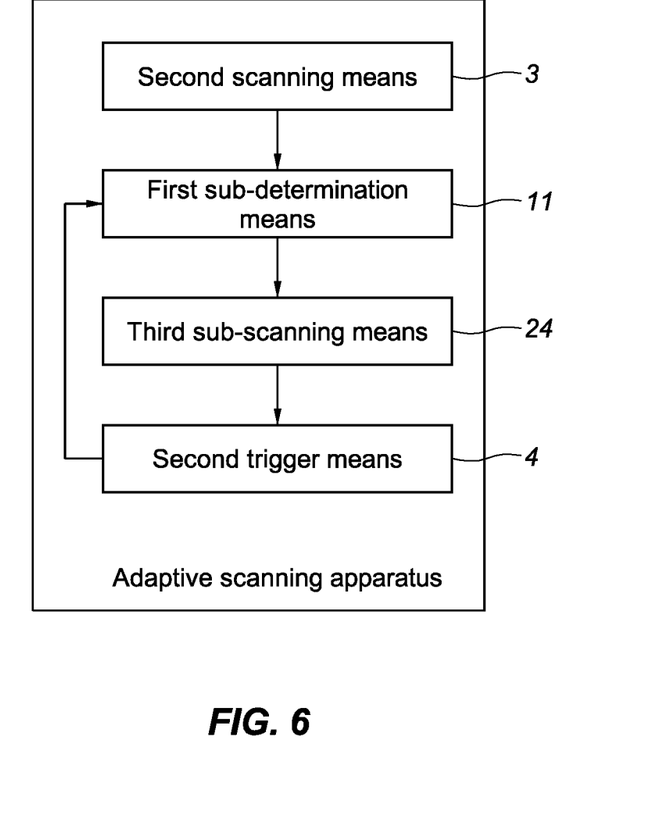
FIG. 6 is a structural schematic diagram of an apparatus for scanning information to be scanned according to another embodiment of the present invention.

FIG. 6 is a structural schematic diagram of an apparatus for scanning information to be scanned according to another embodiment of the present invention. The adaptive scanning apparatus of this embodiment comprises a determination means 1, a first scanning means 2, a means for scanning partial information in the information to be scanned (hereinafter referred to as "second scanning means 3"), and a means for triggering the determination means 1 and the first scanning means 2 to repeatedly execute operations until all information in the information to be scanned has been scanned (hereinafter referred to as "second trigger means 4"), wherein the determination means 1 further comprises a first sub-determination means 11, and the first scanning means 2 further comprises a third sub-scanning means 24.

The second scanning means 3 scans partial information in the information to be scanned.

For example, when the number of CPU cores is 1, the second scanning means 3 scans one file in the information to be scanned.

As another example, when the number of CPU cores is 2, the second scanning means 3 scans two files in the information to be scanned.

The first sub-determination means 11 determines the delay duration from the end of the current scan to the start of a next scan according to the current performance information about the CPU.

Specifically, for each scan, the first sub-determination means 11 needs to acquire the current performance information about the CPU, and determine the delay duration from the end of this scan to the start of a next scan according to the current performance information about the CPU.

The implementation of the first sub-determination means 11 determining the delay duration from the end of the current scan to the start of a next scan according to the current performance information about the CPU is the same as or similar to the implementation of the determination means 1 with reference to FIG. 4, and will not be repeated redundantly here.

Then, after the end of scan and after the latest determined delay duration, the third sub-scanning means 24 conducts another scan to scan all or partial unscanned information in the information to be scanned.

For example, the first sub-determination means 11 determines the delay duration from the end of the current scan to the start of a next scan according to the current performance information about the CPU; and after the end of the current scan and after the latest determined delay duration, the third sub-scanning means 24 conducts another scan to scan all or partial unscanned information in the information to be scanned.

The second trigger means 4 triggers the first sub-determination means 11 and the third sub-scanning means 24 to repeatedly execute operations, until all information in the information to be scanned has been scanned.

For example, the number of CPU cores is 1, and the information to be scanned comprises four files: file 1, file 2, file 3 and file 4. The second scanning means 3 scans file 1; the first sub-determination means 11 determines a delay time t1 from the end of the scan for file 1 to the start of a next scan; after the end of scan for file 1 and after t1, the third sub-scanning means 24 conducts another scan to scan file 2; the second trigger means 4 determines that the information to be scanned has unscanned files, triggers the first sub-determination means 11 to execute the operation to determine a delay time t2 from the end of the scan for file 2 to the start of a next scan, and then triggers the third sub-scanning means 24 to execute the operation, so as to conduct another scan after the end of the scan for file 2 and after t2 to scan file 3; similarly, the second trigger means 4 triggers the first sub-determination means 11 again to execute the operation to determine a delay time t3 from the end of the scan for file 3 to the start of a next scan, and then triggers the third sub-scanning means 24 to execute the operation to conduct another scan after the end of the scan for file 3 and after t3 to scan file 4; and the second trigger means 4 judges whether all information in the information to be scanned has been scanned after scanning file 4, and stops the scanning operation.

It should be noted that it is unnecessary to execute the operations of the second scanning means 3 and the first sub-determination means 11 in sequence strictly, for example, when the scanning executed by the second scanning means 3 is coming to an end, the first sub-determination means 11 may execute the operation in parallel to determine the delay duration; and as another example, after the end of the scan executed by the second scanning means 3, the first sub-determination means 11 immediately operates to determine the delay duration. Similarly, when the scan executed by the third sub-scanning means 24 is coming to an end, the second trigger means 4 may execute the operation to trigger the first sub-determination means 11 to repeatedly execute an operation; or after the end of the scan executed by the second trigger means 4, the second trigger means 4 may immediately trigger the first sub-determination means 11 to execute the operation.

According to the solution of this embodiment, in the multiple scans for the information to be scanned, by the computer device determining, when each scan is coming to an end or after the end, the delay duration from the end of the current scan to the start of a next scan in real time, and controlling the start of the next scan according to the delay duration, the scanning of the information to be scanned can be more adaptable to the current usage of CPU. That is, in the multiple scans, the delay duration from the end of each scan to the start of a next scan is determined in real time according to the current performance information about the CPU, so as to better avoid problems such as slow running due to high occupancy ratio of CPU resources during scanning.

It should be noted that, the present invention may be implemented in software and/or a combination of software and hardware, for example, each apparatus in the present invention may be implemented using an application-specific integrated circuit (ASIC) or any other similar hardware device. In an embodiment, the software programs of the present invention may be executed through a processor to implement the above steps or functions. Similarly, the software programs of the present invention (comprising relevant data structures) may be stored in a computer-readable recording medium, for example, a RAM, a magnetic or optical driver, a floppy disk, or a similar device. Furthermore, some steps or functions of the present invention may be implemented using hardware, for example, a circuit cooperating with the processor so as to execute each step or function.

For those skilled in the art, it is clear that the present invention is not limited to the details of the above exemplary embodiments, and the present invention can be implemented in other particular forms without departing from the spirit or basic features of the present invention. Therefore, in any way, the embodiments should be regarded as exemplary, rather than limiting; the scope of the present invention is limited by the appended claims, instead of the description above. Thus, all variations intended to fall into the meaning and scope of equivalent elements of the claims should be covered within the present invention. No reference numerals in the claims should be regarded as limiting the involved claims. Additionally, it is obvious that the term "comprise" does not exclude other units or steps, and singularity does not exclude plurality. A plurality of units or means set forth in a system claim may also be implemented by a single unit or means through software or hardware. Terms such as first and second are used to indicate names, but do not indicate any particular sequence.

What is claimed is:

1. A method for virus scan on a computer device comprising a processor with one or more central processing unit (CPU) cores, comprising:
scanning at least one file by each of the one or more CPU cores during a first scan;
determining a delay duration for waiting between a start of a second scan and an end of the first scan based on a ratio between a current occupancy ratio of the processor and a number of the one or more CPU cores;
conducting the second scan to scan at least one unscanned file by each of the one or more CPU cores according to said determining; and
repeating said conducting until all files on the computer device have been scanned.

2. A method for repeatedly scanning information on a computer device, comprising:
determining a delay duration for delaying a start of a second scan from an end of a first scan of the information according to performance information about a processor of the computer device; and
scanning the information according to said determining,
wherein the processor comprises at least one central processing unit (CPU), and
wherein the performance information comprises a current occupancy ratio of a selected CPU among the at least one CPU and a number of CPU cores of the processor,
wherein the delay duration is based on a ratio between the current occupancy ratio and the number of the one or more CPU cores.

3. The method of claim 2, wherein said scanning the information includes:
scanning partial information of the information during the first scan; and
conducting the second scan to scan at least a portion of unscanned information in the information.

4. The method of claim 3, further comprising:
conducting an additional scan to scan at least a portion of the unscanned information in the information; and
repeating said conducting the additional scan until all information in the information has been scanned.

5. The method of claim 2, further comprising scanning partial information in the information to be scanned,
wherein said determining the delay duration comprises determining the delay duration from an end of a current scan of the information to a start of a subsequent scan according to the performance information about the processor of the computer device, and
wherein said scanning the information includes conducting the subsequent scan after the end of the current scan and after the determined delay duration to scan all or partial unscanned information in the information.

6. The method of claim 5, further comprising repeating said determining the delay duration and said conducting the subsequent scan until all of the information has been scanned.

7. The method of claim 5, wherein said determining the delay duration is in parallel with performing the current scan of the information.

8. The method of claim 2, further comprising predefining one or more occupancy ratio ranges each corresponding to a duration value, wherein said determining comprises:
determining, from the one or more occupancy ratio ranges, an occupancy ratio range that the current occupancy ratio of the selected CPU is within; and
determining the delay duration based on the duration value corresponding to the determined occupancy ratio range.

9. The method of claim 2, wherein said determining the delay duration comprises determining the delay duration according to the current occupancy ratio of the selected CPU, the number of the CPU cores of the processor, a first time interval and a predetermined reference value of the number of the CPU cores.

10. The method of claim 2, wherein said determining the delay duration comprises determining the delay duration according to the performance information about the processor and a first time interval.

11. The method of claim 10, wherein said determining the delay duration comprises determining the delay duration according to the performance information about the processor, the first time interval and a predetermined reference value of the number of the CPU cores.

12. The method of claim 2, further comprising:
determining whether the performance information about the processor satisfies a predetermined scanning condition before starting the first scan; and
proceeding with said determining the delay duration and said scanning the information based upon a determination that the performance information satisfies the predetermined scanning condition.

13. The method of claim 12, further comprising:
delaying the first scan for a predetermined time period based upon a determination that the performance information does not satisfy the predetermined scanning condition; and
repeating said determining whether the performance information about the processor satisfies the predetermined scanning condition upon expiry of the predetermined time period.

14. The method of claim 12, wherein said determining whether the performance information about the processor satisfies the predetermined scanning condition comprises determining whether the current occupancy ratio of the selected CPU satisfies the predetermined scanning condition.

15. The method of claim 14 wherein the predetermined scanning condition comprises that the current occupancy ratio of the selected CPU is lower than an occupancy ratio threshold.

16. The method of claim 12, wherein said determining whether the performance information about the processor satisfies the predetermined scanning condition comprises determining whether the number of the CPU cores satisfies the predetermined scanning condition.

17. The method of claim 16, wherein the predetermined scanning condition comprises the number of the CPU cores being higher than a core number threshold.

18. An apparatus for repeatedly scanning information on a computer device, comprising:
a processor; and
a memory having one or more programs stored thereon for instructing said processor to:
determine a delay duration for delaying a start of a second scan from an end of a first scan of the information according to performance information about said processor; and
scan the information according the delay duration,
wherein said processor comprises at least one central processing unit (CPU), and
wherein the performance information comprises a current occupancy ratio of a selected CPU among the at least one CPU and a number of CPU cores of said processor,
wherein the delay duration is based on a ratio between the current occupancy ratio and the number of the CPU cores.

* * * * *